(12) United States Patent
Kawano et al.

(10) Patent No.: US 7,598,525 B2
(45) Date of Patent: Oct. 6, 2009

(54) THIN FILM TRANSISTOR ARRAY SUBSTRATE WITH MULTIPLE CHAMFERS AND LIQUID CRYSTAL DISPLAY DEVICE

(75) Inventors: Hideo Kawano, Kawasaki (JP); Hideki Sunayama, Hachiouzi (JP)

(73) Assignee: Info Vision Optoelectronics Holdings Limited, Tortola (VG)

( * ) Notice: Subject to any disclaimer, the term of this patent is extended or adjusted under 35 U.S.C. 154(b) by 143 days.

(21) Appl. No.: 11/901,428

(22) Filed: Sep. 17, 2007

(65) Prior Publication Data

US 2008/0088760 A1    Apr. 17, 2008

(30) Foreign Application Priority Data

Sep. 15, 2006    (JP)    ............................. 2006-251545

(51) Int. Cl.
*H01L 29/10*    (2006.01)
(52) U.S. Cl. ............................. 257/59; 257/72; 257/291
(58) Field of Classification Search .................. 257/59, 257/72, 291
See application file for complete search history.

(56) References Cited

U.S. PATENT DOCUMENTS 5,781,262 A * 7/1998 Suzuki et al. ............... 349/128
6,016,174 A * 1/2000 Endo et al. ................... 349/43
6,816,220 B2 * 11/2004 Baek et al. ................... 349/139

FOREIGN PATENT DOCUMENTS

JP    2001356357 A    12/2001

* cited by examiner

*Primary Examiner*—Douglas M Menz
(74) *Attorney, Agent, or Firm*—Scully, Scott, Murphy & Presser, P.C.

(57) ABSTRACT

The present invention relates to a thin film transistor array substrate with multiple chamfers and liquid crystal display device. A wiring structure is provided on the thin film transistor array substrate with multiple chamfers which is used for producing a plurality of thin film transistor arrays from a mother substrate, said wiring structure allows the chamfer quantity to be confirmed easily in the chamfer process for cutting off the corners of the terminal face after the cutting off process for taking out the respective thin film transistor arrays, meanwhile, the OLB pads is not easy to be peeled off from the substrate, and the probability that the OLB pads are peeled off can be reduced. On the thin film transistor array substrate with multiple chamfers, on the terminal face wiring up to the boundary of the OLB pad and the cut off line, the branch wiring is configured at both sides of said wiring based on the predetermined interval as the branch wiring for scale and OLB protection, when the chamfer is performed after the thin film transistor arrays are cut off from the mother substrate, the branch wiring for scale and OLB protection is used as a scale for confirming the dimension from the terminal face of the substrate to the OLB pad, and the OLB pad is not easy to be peeled off from the substrate.

6 Claims, 6 Drawing Sheets

THIN FILM TRANSISTOR ARRAY SUBSTRATE WITH MULTIPLE CHAMFERS AND LIQUID CRYSTAL DISPLAY DEVICE

The present invention claims the benefit of Japanese Pat. Application No. 2006-251545, filed in Japan on Sep. 15, 2006, which is hereby incorporated by reference.

FIELD OF THE INVENTION

The present invention relates to a wiring structure, which contributes to improve the end product rate of a process when individual thin film transistor arrays are cut off from a thin film transistor array substrate with multiple chamfers, which is configured by a plurality of thin film transistors on a mother substrate.

DESCRIPTION OF THE RELATED ART

Recently, the mainstream of the Liquid crystal display device is active matrix type liquid crystal display device. Generally, after forming on a mother substrate a plurality of thin film transistor arrays used by such active matrix type liquid crystal display device, the mother substrate is cut into individual thin film transistor arrays.

A process following immediately the cut off process is a chamfer process for preventing the cut off terminal faces from producing defects, and the like. In said chamfer process, sometimes the wirings and pads on the thin film transistor arrays may be peeled off. Particularly, the problem of peeling off the pads exists in the connection parts, that is, the outer lead bonding (Simplified as OLB), of the thin film transistor arrays and the external circuits, and the like. It will be described below in conjunction with the drawings.

FIG. 2 is a view in the prior art for illustrating the position relationship between the cut off line and the OLB pad when the cut off is performed under a condition that four pieces of thin film transistor arrays are produced from one mother substrate. In FIG. 2, 201 refers to a thin film transistor array substrate with multiple chamfers, 110 refers to a longitudinal cut off line, 203 refers to a transverse cut off line, 107 refers to terminal face wiring, and 211~214 refer to thin film transistor arrays on the mother substrate before being cut off.

FIG. 6 is a partial plan view in the prior art for illustrating the position relationship between a thin film transistor array on the thin film transistor array substrate with multiple chamfers and the cut off line. In FIG. 6, 110 is the cut off line used for cutting off the thin film transistor arrays from the thin film transistor array substrate with multiple chamfers, 111 is a chamfer reference line used in the chamfer process as a chamfer quantity reference after said cutting off, and B is a distance from the OLB pad 104 to the chamfer reference line 111.

In order to take out the thin film transistor array 212 from the mother substrate 201, the thin film transistor array substrate with multiple chamfers is cut off along the cut off line 110. Subsequently, the chamfer process is performed on the cut off terminal face in order to prevent the defects, and the like, from producing on the cut off terminal face, and the corners of the cut terminal face are pared away. At this time, if the corners of the cut off terminal face are pared away too much, then the terminal face wiring 107 will be peeled off from the mother substrate, even the OLB pad 104 connected with the terminal face wiring 107 will be peeled off. Thus, the chamfer quantity should be carefully paid attention by determining the distance B frequently while the chamfer task is performed, so that significant labor and circumspection are required for the operation.

Thus, if the above chamfer quantity can be confirmed easily, then the manufacturing efficiency will rise rapidly.

Further, allowing the wiring not to be peeled off easily from the substrate is effective for increasing the manufacturing efficiency.

Above-mentioned prior art can refer to Pat. Document 1: Japanese Publication No. 2001-356357

SUMMARY OF THE INVENTION

The object of the present invention is to provide a thin film transistor array with multiple chamfers having the following wiring structure, that is, on a thin film transistor array substrate with multiple chamfers which is produced by a plurality of thin film transistor arrays on a mother substrate, in a chamfering process for cutting off the corners of the terminal face after the terminal face being cut off in order to take out the individual thin film transistor arrays, the confirmation of the chamfer quantity can be performed easily and reliably, meanwhile, the OLB pad is not easy to be peeled off from the substrate thereby the peel off rate of the OLB pad in the chamfer process can be reduced, and the production efficiency and the end product rate of the manufacture process of the thin film transistor arrays can be improved.

In order to solve the above subject, the contrivance described in the first aspect of the present invention is a thin film transistor array substrate with multiple chamfers, a plurality of thin film transistor arrays are configured on a mother substrate, each of the thin film transistor arrays comprises:

signal lines and scan lines, configured to be at the longitudinal and transverse directions on an insulated substrate;

display elements formed in the position adjacent to the intersection points of said signal lines and said scan lines; and a plurality of outer lead bonding pads (Hereinafter, referred to as "OLB Pads") and the wiring for connecting are formed at the peripheral of said insulated substrate in order to connect to the outside after cutting off from said mother substrate, wherein:

outside said OLB pad, branch wiring (Hereinafter, referred to as "branch wiring for scale and OLB protection") is provided based on the predetermined interval at two sides of the wiring (Hereinafter, referred to as "terminal face wiring") which intersects with the line (Hereinafter, referred to as "cut off line") used for representing the position where said thin film transistor array is cut off from said thin film transistor array substrate, thereby said thin film transistor array substrate with multiple chamfers is cut off.

Further, the contrivance of the second aspect of the present invention is that in the thin film transistor array substrate with multiple chamfers according to the first aspect of the present invention, wherein said branch wiring for scale and OLB protection is used to confirm the dimension from the terminal face of said substrate used by said display device to said OLB pad and used to prevent said OLB pad peeling off from the substrate used by said display device Further, the contrivance of the third aspect of the present invention is that in the thin film transistor array substrate with multiple chamfers according to the first aspect of the present invention, wherein said thin film transistor array is a thin film transistor array used by the active matrix type liquid crystal display device.

Further, the contrivance of the fourth aspect of the present invention is a liquid crystal display device, wherein it comprises the thin film transistor array cut off from said thin film transistor array substrate with multiple chamfers according to the contrivance of any of the first aspect to the third aspect.

According to the present invention, in order to fabricate a plurality of thin film transistor arrays on a mother substrate of one thin film transistor array substrate, and take out the individual thin film transistor arrays, it requires that the chamfer process for the cut off terminal face after cutting off is performed by less labor, meanwhile, the proportion that the OLB pads are peeled off can be reduced, as well as the manufacture cost of the thin film transistor arrays can be decreased, and the quality can be improved.

Figure 1:
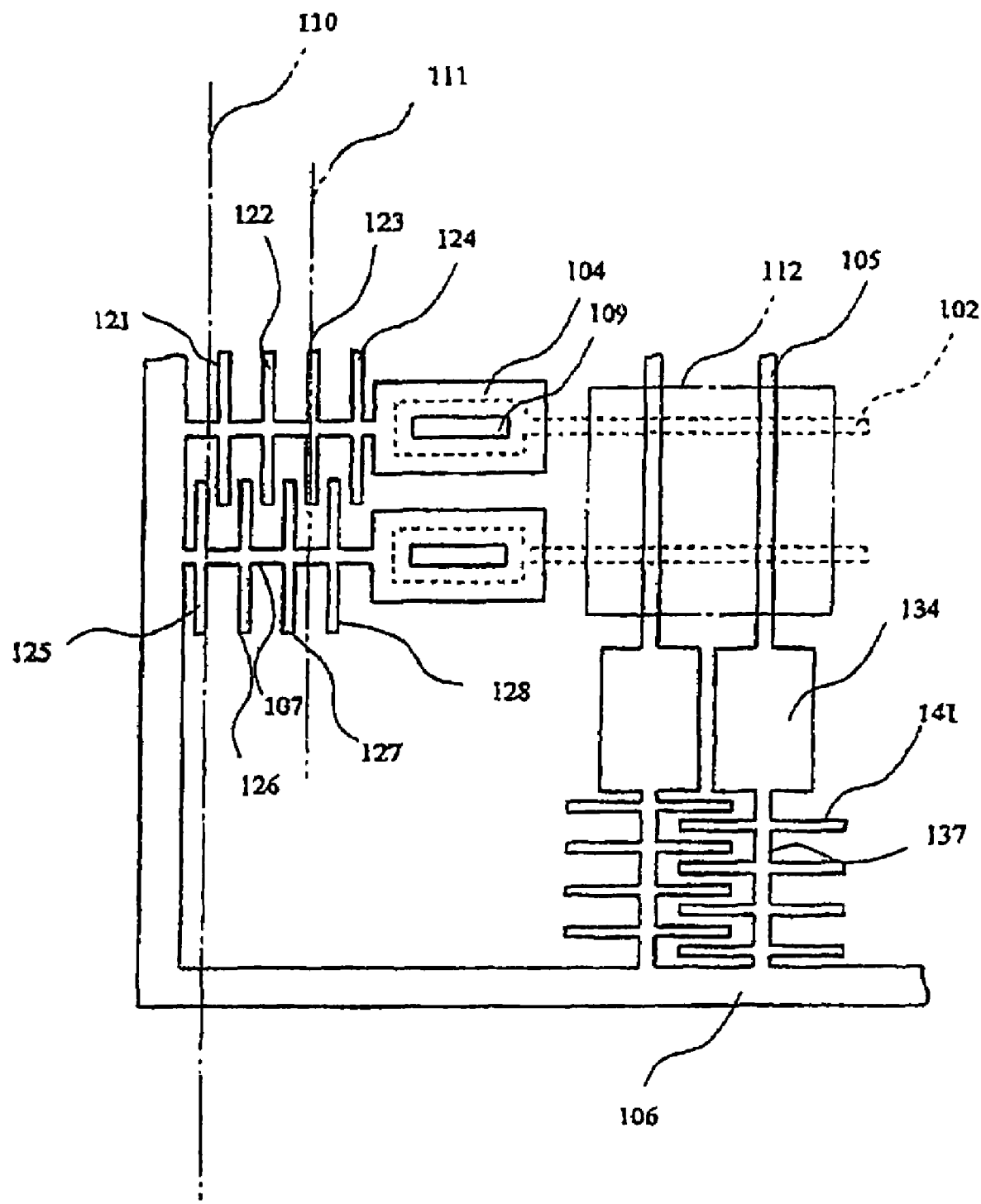
FIG. 1 is a partial plan view for illustrating a thin film transistor array substrate with multiple chamfers comprising special wiring structure according to the present invention.
Figure 2:
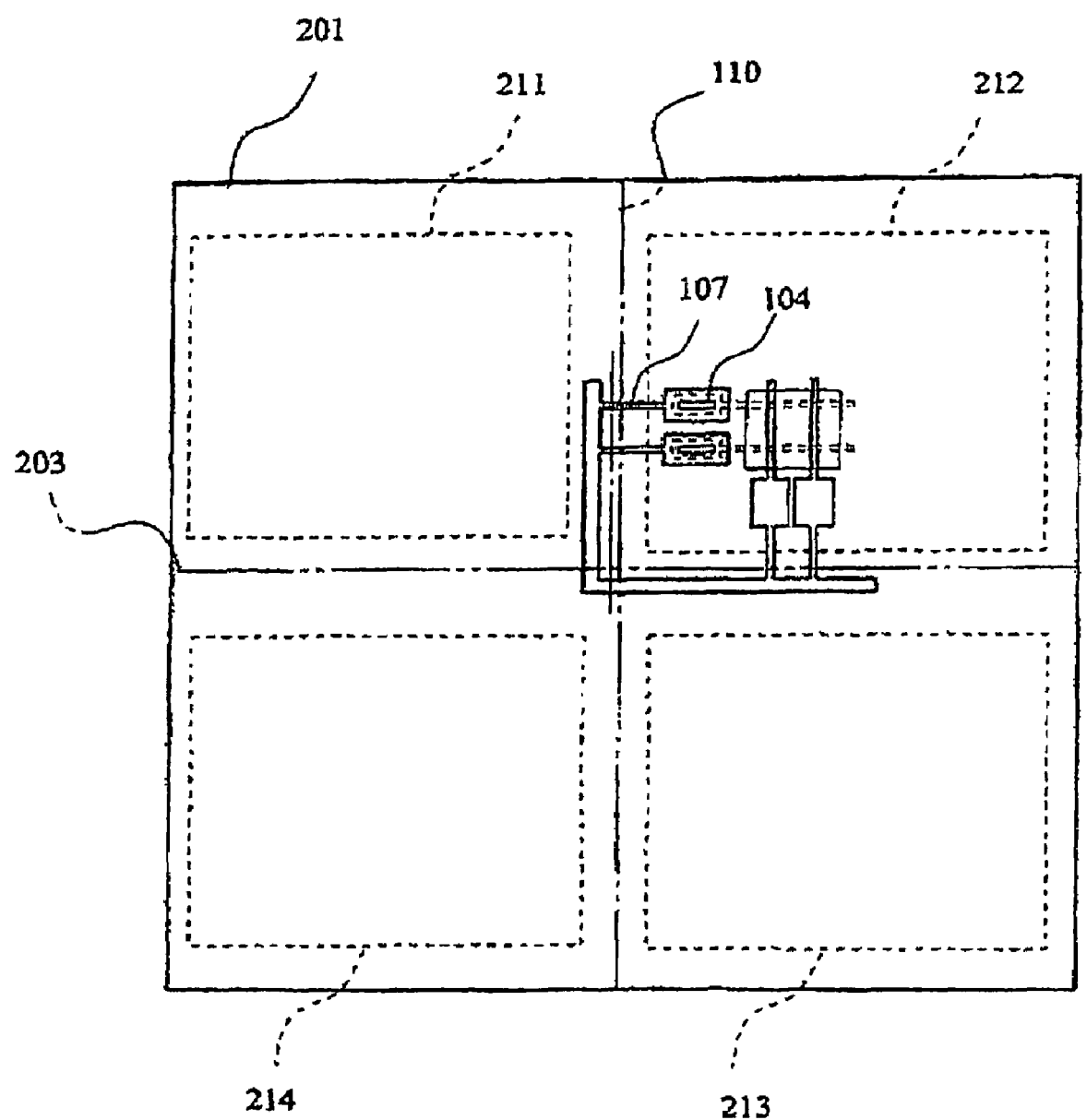
FIG. 2 is a view in the prior art for illustrating the position relationship between the cut off line and the OLB pad when the cut off is performed under a condition that four pieces of thin film transistor arrays are produced from one another substrate.

102 scan line
104 OLB pad
105 signal line
106 wiring used for checking
107 terminal face wiring
109 via hole used for connecting scan line 102 and OLB pad 104
110 cut offline
111 chamfer reference line
121 branch wiring for scale and OLB protection
122 branch wiring for scale and OLB protection
123 branch wiring for scale and OLB protection
124 branch wiring for scale and OLB protection
125 branch wiring for scale and OLB protection
126 branch wiring for scale and OLB protection
127 branch wiring for scale and OLB protection
128 branch wiring for scale and OLB protection
134 OLB pad
137 terminal face wiring
141 branch wiring for scale and OLB protection

DETAILED DESCRIPTION OF PREFERRED EMBODIMENTS

The preferred configuration for embodying the present invention will be described with reference to the drawings.

FIG. 1 is a partial plan view for illustrating a thin film transistor array substrate with multiple chamfers comprising special wiring structure according to the present invention.

In FIG. 1, 121~128 represent the branch wiring for scale and OLB protection, 107 is a terminal face wiring, 104 is an OLB pad, 102 is a scan line, 105 is a signal line, 109 is a via hole used for connecting the scan line 102 and the OLB pad 104, 110 is a cut off line, 111 is a chamfer reference line used as a reference of the chamfer quantity, 112 is a display region configured by the pixels, and 106 is wiring used for checking. Only a portion of the display region, scan line, signal line of the thin film transistor array substrate is shown in FIG. 1. The reason for indicating the scan line 102 by the dotted line is that the layer where the scan line 102 is located at is different from the layer where the signal line 105 is located at, which is under the layer where the signal line 105 being located at. As the branch wiring for scale and OLB protection, any one of 121~128 is the same branch wiring for scale and OLB protection, the different reference signs are only used for describing conveniently.

In the thin film transistor array substrate with multiple chamfers of the present invention, the wiring between the wiring used for checking 106, and the OLB pad 104, that is, across two sides of the terminal face wiring 107 set by the cut off line 110, the branch wiring is provided at predetermined interval in a tree branch shape as the branch wiring for scale and OLD protection 121~128. By providing said branch wiring for scale and OLD protection, after cutting off the thin film transistor array substrate with multiple chamfers along the cut off line 110, in the chamfer process for cutting off the corners of the terminal face, the branch wiring for scale and OLD protection 121~128 is used as the scale for confirming the chamfer quantity. If the branch wiring for scale and OLB protection can be used as a reference, then the confirmation of the chamfer quantity will be performed easily without any graduated scale, and the like, and the confirmation of the chamfer quantity will be easy. As a result, the work efficiency can be increased. Because the branch wiring for scale and OLB protection is provided, the OLD pad 104 is not easy to be peeled off. It will be described below according to the drawings.

Figure 3:
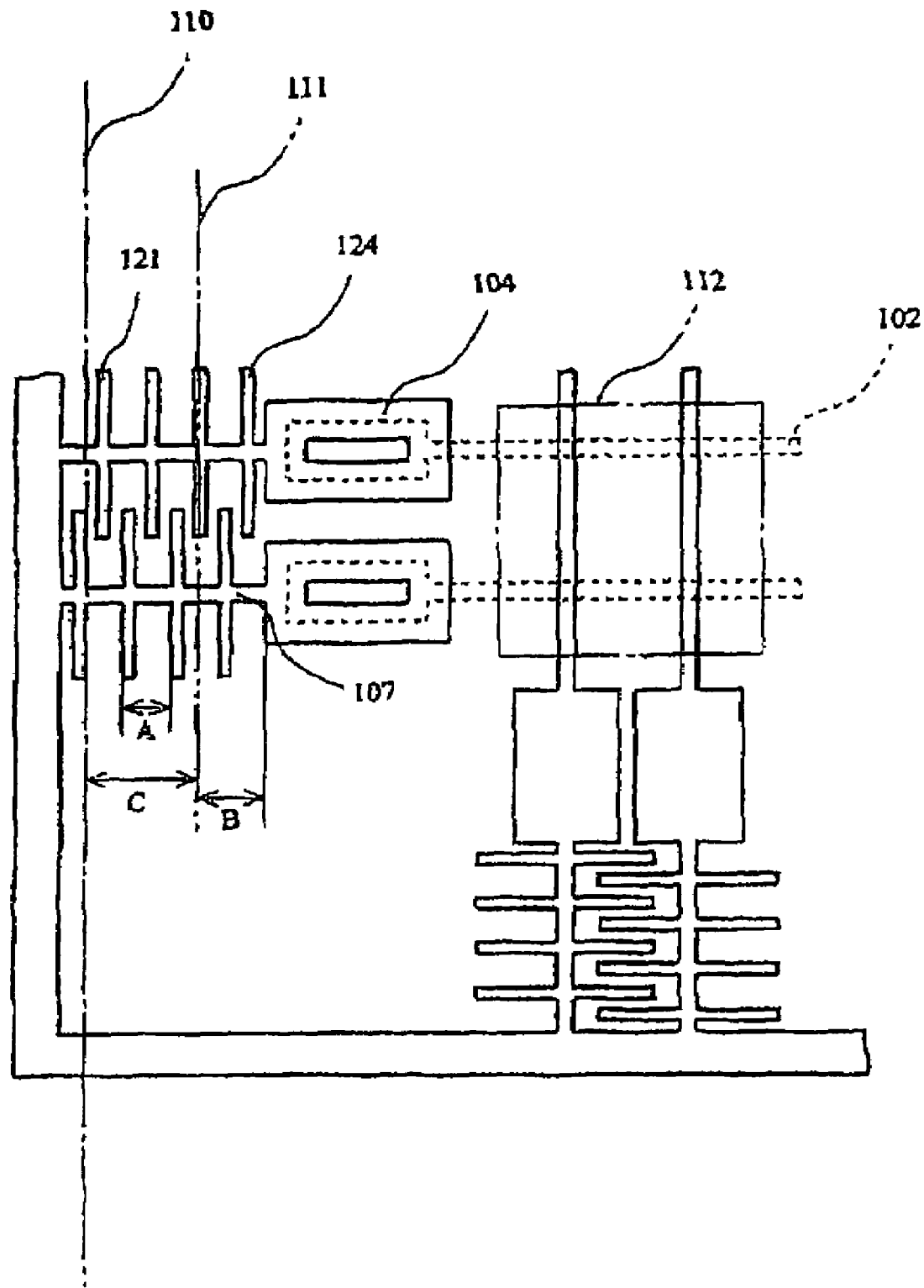
FIG. 3 is a partial plan view for illustrating the result under a condition that the wiring structure of the thin film transistor array substrate with multiple chamfers according to the present invention is provided.

FIG. 3 is a partial plan view for illustrating the result under a condition that the wiring structure of the tin film transistor array substrate with multiple chamfers according to the present invention is provided. In FIG. 3, A is an interval between the adjacent branch wiring for scale and OLD protection, C is a distance from the cut off terminal face to the chamfer reference line, B is a distance from the OLD pad 104 to the chamfer reference line 111.

Figure 4:
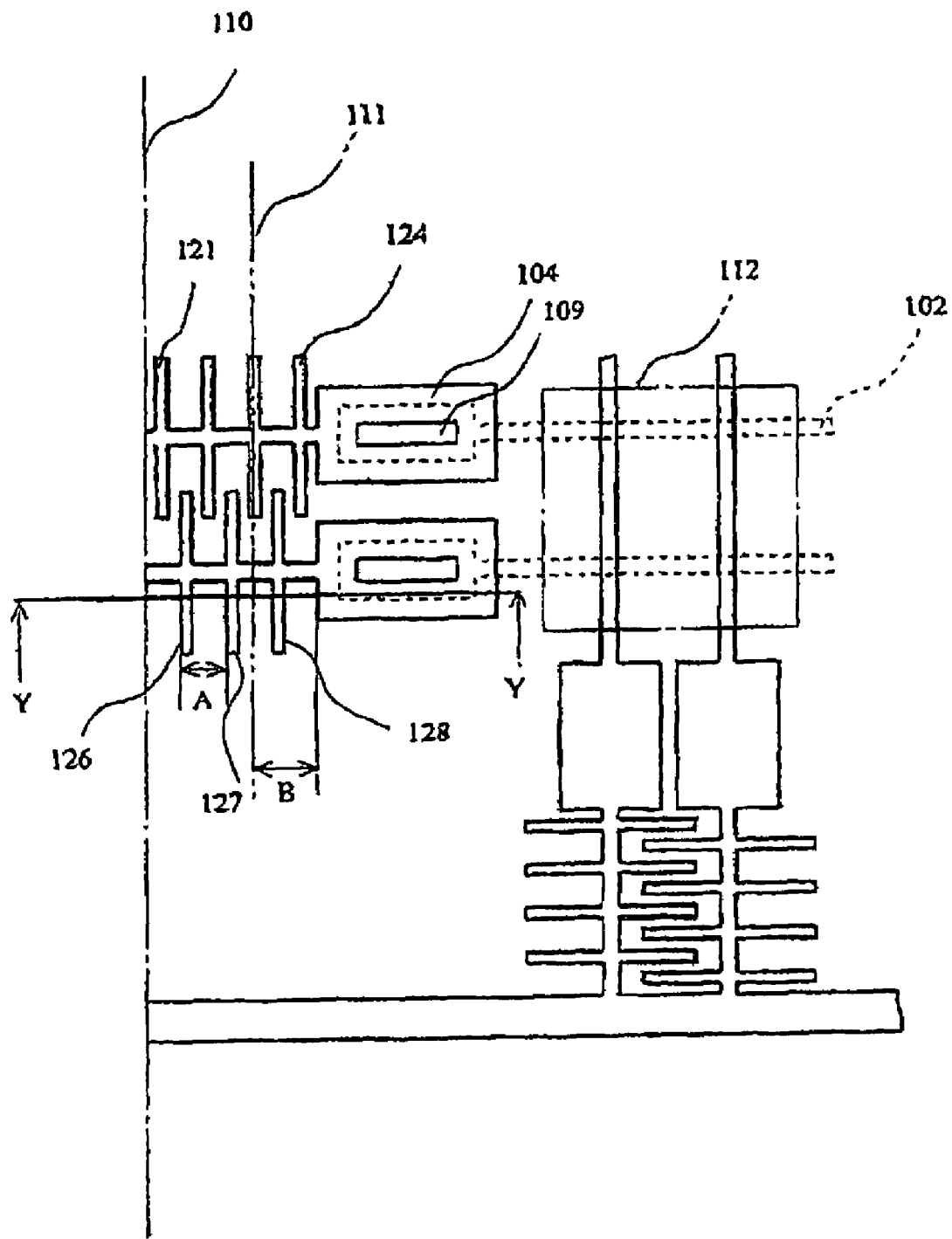
FIG. 4 is a partial plan view of a thin film transistor array substrate which is cut off along the cut off line 110 as shown in FIG. 3.

FIG. 4 is a partial plan view of a thin film transistor array substrate which is cut off along the cut off line 110 as show in FIG. 3.

Figure 5:
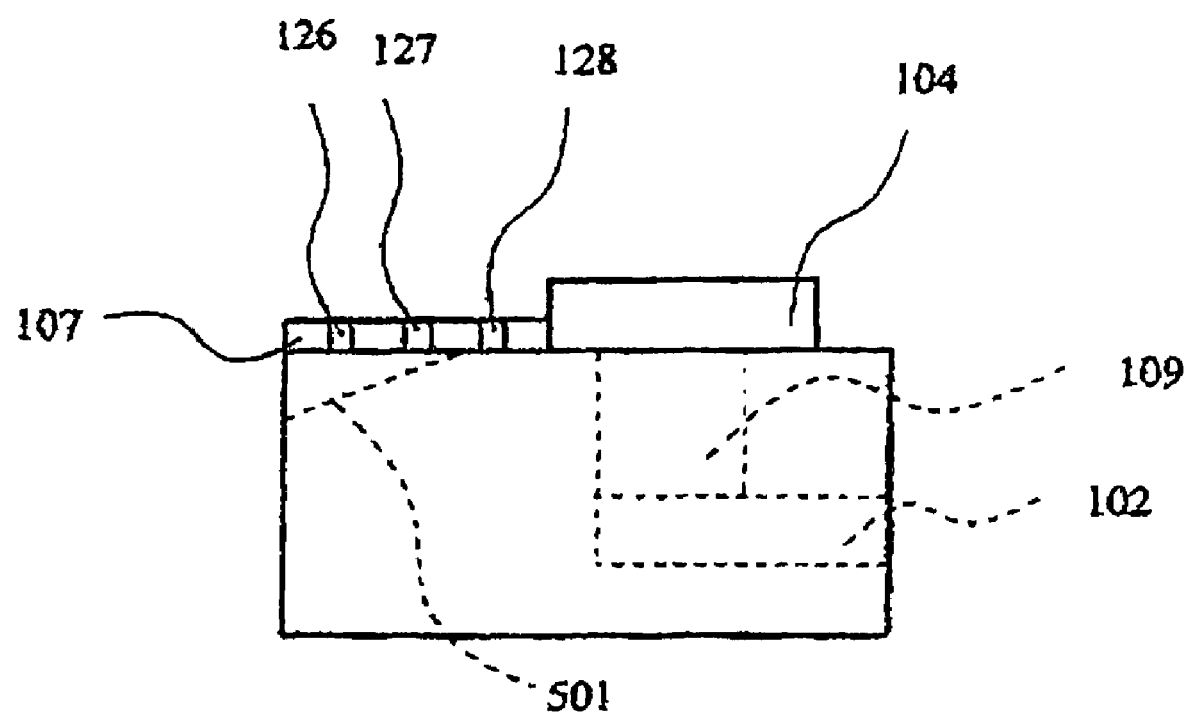
FIG. 5 is a sectional view taken along the cut off line Y-Y as shown in FIG. 4.
Figure 6:
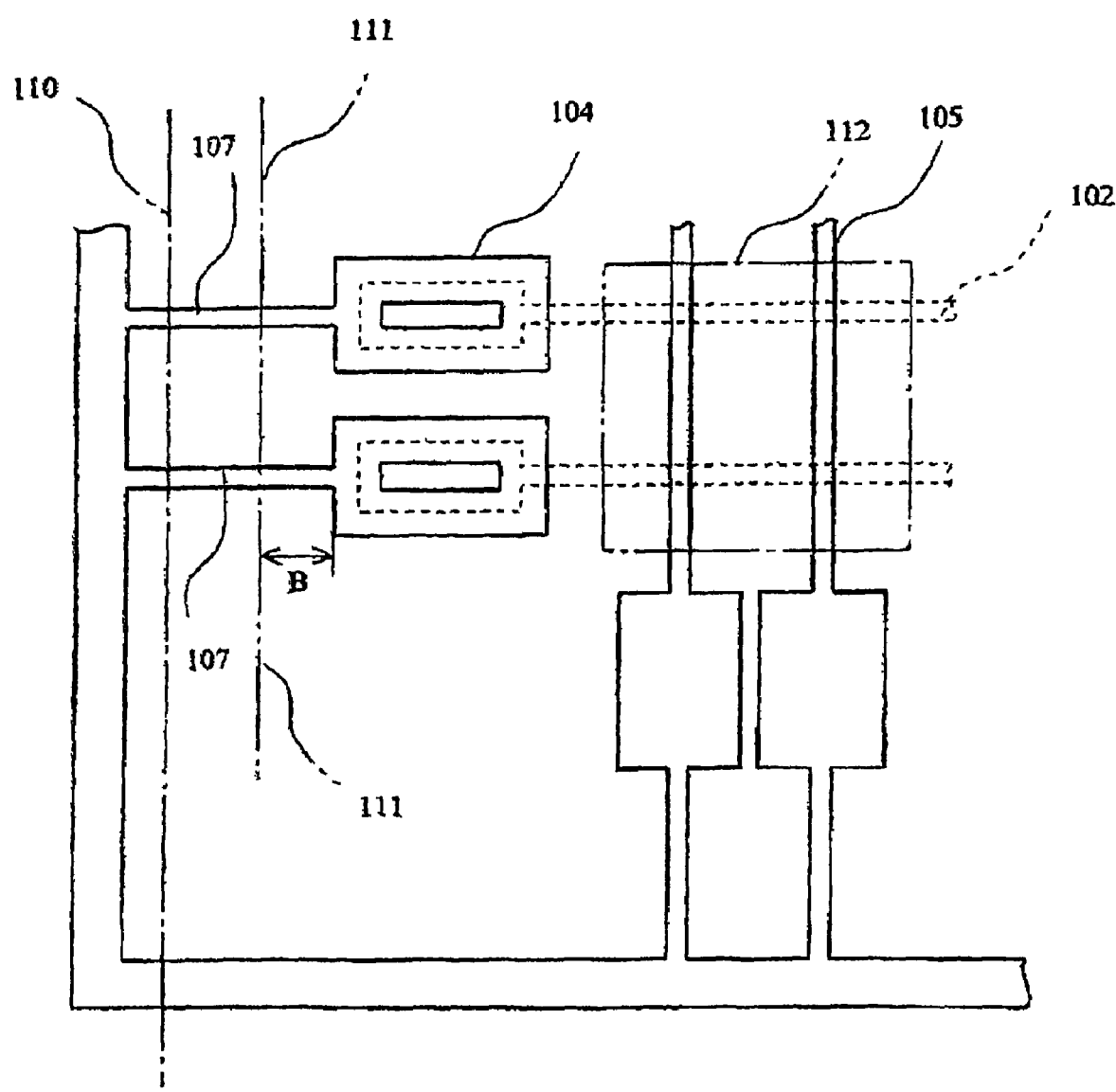
FIG. 6 is a partial plan view in the prior art for illustrating the position relationship between a thin film transistor array on the thin film transistor array substrate with multiple chamfers and the cut off line.

FIG. 5 is a sectional view taken along the cut off line Y-Y as show in FIG. 4. In FIG. 5, 501 is a line indicating the peeled off part when the chamfer being performed (Hereinafter, referred to as "chamfer line"). If the chamfer is performed to reach the chamfer line 501, then it will be understood from FIG. 5, the terminal face wiring 107, the branch wiring for scale and OLB protection 126, the branch wiring for scale and OLB protection 127 up to the chamfer line 501 will be peeled off. Under such condition, if the branch wiring for scale and OLB protection is not provided, then the force applied to the terminal face wiring 107 will be applied entirely to the OLB pad, and the OLB pad will be peeled off easily. On the other hand, once the branch wiring for scale and OLB protection is provided, although the branch wiring for scale and OLB protection 126, the branch wiring for scale and OLB protection 127 are peeled off, but the branch wiring for scale and OLB protection 128 is fixed on the substrate by a force corresponding to the area of said branch wiring thereby it is not peeled off from the substrate, the force applied to the terminal face wiring 107 is suppressed by the branch wiring for scale and OLB protection 128, thereby it may prevent the OLB pad from peeling off from the substrate.

Furthermore, because the object is to prevent the OLB pad from peeling off, so the chamfer quantity must be confirmed while the task is performed, however, if the branch wiring for scale and OLB protection is provided, then the task can be performed by using the branch wiring for scale and OLB protection as a reference without the use of any other graduated scale, and the like. It will be described below according to FIG. 3. Under a condition that the chamfer is performed to near the chamfer reference line 111, if the branch wiring for scale and OLB protection is not provided, then the distance from the OLB pad will be confirmed frequently, and said distance is a distance above B will be confirmed frequently. However, the wiring on the thin film transistor array substrate with multiple chamfers and the OLB pads are tiny things, it is very difficult to be confirmed. On the other hand, the branch wiring for scale and OLB protection is provided, and the interval A between the adjacent branch wiring for scale and OLB protection is set to a predetermined value, thus, under the condition that the branch wiring for scale and OLB protection is provided, the chamfer task can be performed under a reference set in advance and considered that from OLB pad to which branch wiring for scale and OLB protection is suitable. Under the condition of FIG. 4, the peeling can be performed until it reaches the branch wiring for scale and OLB protection 127, and leaves the branch wiring for scale and OLB protection 128. When such operation method is used, the operation is simple and reliable without the need of other graduated scale, and the like.

Furthermore, because the manufacturing method of the thin film transistor array substrate with multiple chamfers according to the present invention is a known photolithographic method, so the description thereof will be omitted.

Further, the invention described above is performed based on the branch wiring for scale and OLB protection of the terminal face wiring connected with the OLB pad 104 connected on the scan line, however, the condition that the terminal face wiring 137 connected with the OLB pad 134 which is shown in FIG. 1 and connected with the signal line is the same. As shown in FIG. 1, it will be all right when the branch wiring for scale and OLB protection 141 is set for the terminal face wiring 137. Even though it is not signal line or scan line, the terminal face wiring, which is suitable for using in a condition that the wiring structure is the same as that in the present embodiment, can also be formed.

What is claimed is:

1. A thin film transistor array substrate with multiple chamfers, a plurality of thin film transistor arrays are configured on a mother substrate, each of the thin film transistor arrays comprises:

signal lines and scan lines, configured to be at the longitudinal and transverse directions on an insulated substrate;

display elements formed in the position adjacent to the intersection points of said signal lines and said scan lines; and a plurality of outer lead bonding pads (Hereinafter, referred to as "OLB Pads") and the wiring for connecting are formed at the peripheral of said insulated substrate in order to connect to the outside after cutting off from said mother substrate, wherein:

outside said OLB pad, branch wiring (Hereinafter, referred to as "branch wiring for scale and OLB protection") is provided based on the predetermined interval at two sides of the wiring (Hereinafter, referred to as "terminal face wiring") which intersects with the line (Hereinafter, referred to as "cut off line") used for representing the position where said thin film transistor array is cut off from said thin film transistor array substrate, thereby said thin film transistor array substrate with multiple chamfers is cut off.

2. The thin film transistor array substrate with multiple chamfers as claimed in claim 1, wherein said branch wiring for scale and OLB protection is used to confirm the dimension from the terminal face of said substrate used by said display device to said OLB pad and used to prevent said OLB pad peeling off from the substrate used by said display device.

3. The thin film transistor array substrate with multiple chamfers as claimed in claim 1, wherein said thin film transistor array is a thin film transistor array used by the active matrix type liquid crystal display device.

4. A liquid crystal display device, wherein, comprising thin film transistor arrays that are cut off from said thin film transistor array substrate with multiple chamfers as claimed in claim 1.

5. A liquid crystal display device, wherein, comprising thin film transistor arrays that are cut off from said thin film transistor array substrate with multiple chamfers as claimed in claim 2.

6. A liquid crystal display device, wherein, comprising thin film transistor arrays that are cut off from said thin film transistor array substrate with multiple chamfers as claimed in claim 3.

* * * * *